May 24, 1966  R. D. LEE ETAL  3,252,680
ROOF SUPPORTS
Filed July 14, 1965
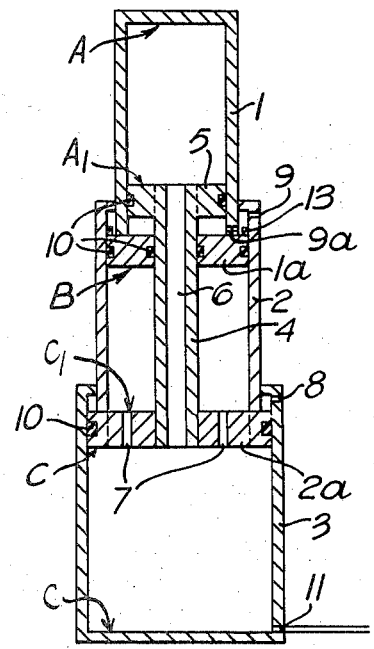
Fig.1.
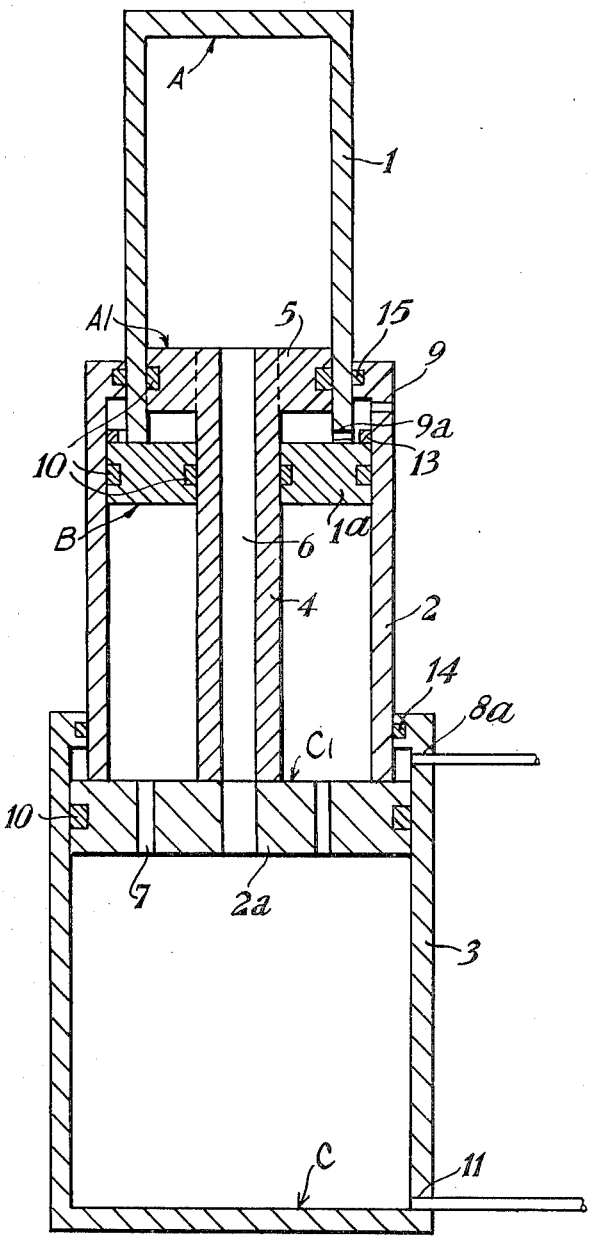
Fig.2.
Fig.3.
Inventors:
Roger Demant-Lee
and
David Horton
BY Baldwin & Wight
Attorneys

United States Patent Office 3,252,680
Patented May 24, 1966

3,252,680
ROOF SUPPORTS
Roger Demant Lee, Great Sankey, near Warrington, and David Horton, Appleton, Warrington, England, assignors to Electro-Hydraulics Limited, Warrington, Lancashire, England, a corporation of the United Kingdom
Filed July 14, 1965, Ser. No. 471,903
Claims priority, application Great Britain, Aug. 21, 1962, 32,132/62
7 Claims. (Cl. 248—354)

This application is a continuation-in-part of our application Serial Number 302,533 filed on August 16, 1963, for roof supports.

Known hydraulically operated roof supports for mines are usually of the type comprising a single plunger slidable in a cylinder. Their use is thus limited to seams whose height lies between the closed and extended lengths of the supports, and consequently it is frequently necessary to provide a variety of roof supports having different closed and extended lengths.

Roof supports of the hydraulically operated telescopic type are also known which have three or more relatively slidable components whereby a greater extension can be obtained from a given closed length of roof support. Supports of this type can be used in a greater variety of seams than the type which comprises only two relatively movable components, but they suffer from the disadvantage that a plurality of yield valves are required in order to give a constant load/yield characteristic to the support, or alternatively if only one yield valve is provided the support yields at substantially different load levels for each telescopic section.

It is the purpose of this invention to provide an improved roof support of the telescopic type which does not suffer from the aforesaid disadvantage.

According to this invention an hydraulically operated roof support comprises three telescopically arranged cylinder components, a first piston member acting on the base of a first cylinder which is closed at its upper end, the first piston member and cylinder being slidably disposed in a second cylinder, with the base of which a second piston member is fast, the second piston member being slidably disposed in a third cylinder, a third piston member slidably disposed in the first cylinder and a piston rod slidable through the first piston member, and arranged to support the third piston member on the second piston member, hydraulic connection being provided between the three cylinders, and the combined effective areas of the first piston member and the first cylinder being substantially equal to that of the second piston member so that the support has a constant load/yield characteristic.

Preferably the hydraulic connection between the first and third cylinders is by means of a passage formed in the piston rod.

The combined effective areas of the first piston member and the upper end of the first cylinder may be made either slightly smaller or greater than that of the second piston member.

Preferably provision is made to introduce fluid under pressure to either or both the second and third cylinder at a point above the first and second piston members respectively to bring about closure of the first and second cylinders respectively.

The piston rod may be secured to or made integral with the third piston member alone, and arranged solely to abut the second piston member, or may be secured to both the second and third piston members. As a further alternative the piston rod may merely have a fluid tight seal with the third piston member and have means, for example a collar, to prevent sliding movement of the third piston member over the rod towards the second piston member.

By virtue of the above arrangement it will be appreciated that only a single pressure relief valve is required, which is conveniently connected to the third cylinder.

The invention is described below with reference to the accompanying drawings in which:

FIGURE 1, is a diagrammatic section through a telescopic roof support which is shown in the extended position;

FIGURE 2 is a sectional view similar to FIGURE 1 of a modified arrangement;

FIGURE 3 is a detailed sectional view showing a further modification;

Referring to FIGURE 1 an hydraulically operated telescopic roof support comprises a first cylinder 1 having a first piston 1a associated with, or attached to its lower end, the cylinder 1 and piston 1a being slidably mounted in a second cylinder 2, to the lower end of which a second piston 2a is secured, the cylinder 2 and piston 2a being slidably mounted in a third cylinder 3. A piston rod 4 is secured at its lower end to the piston 2a and at its upper end to a third piston 5 which is slidable in the cylinder 1, the piston rod 4 passing slidably through an aperture in the piston 1a. A passage 6 is provided in piston rod 4 to provide an hydraulic connection between the cylinders 1 and 3. Vents 8, 9, 9a may be provided in the tops of cylinders 3 and 2, and the bottom of cylinder 1, respectively, and fluid pressure seals are provided as shown at 10. A fluid pressure inlet to the roof support is provided at 11 in cylinder 3, but alternatively may be provided in cylinder 1.

The roof support operates as follows: when fluid pressure is admitted to the support e.g. through the inlet 11, it passes into cylinder 3, and thence through the holes 7 into the cylinder 2, and through the passage 6 in the piston rod 4 to the cylinder 1 above the piston 5. When the combined areas A and B equal the end area of the cylinder 3, which corresponds to the area C of the full area side of the piston 2a, the first cylinder 1 will be extended by fluid pressure acting on the areas A and B. Then when the cylinder 1 is fully extended so that the first piston 1a abuts stops 13, the second cylinder 2 will be extended due to the hydraulic pressure force acting on the areas A and B being transmitted by the piston 1a and the stops 13 to the cylinder 2. In effect, therefore, the cylinder 2 is lifted by the cylinder 1.

If the piston 1a is not attached to the cylinder 1, stops are provided at the lower end of the cylinder 1 to engage stops at the upper end of the cylinder 2, so that the hydraulic force can be transmitted through these stops.

Further to explain the operation of the support, it will be seen that when the combined effective areas A and B equal the area C, since hydraulic communication is provided between all three cylinders, it follows that the hydraulic forces acting on the second piston member 2a are exactly balanced. Thus there are no hydraulic forces acting directly upon the second piston member, tending either to raise or to lower the second cylinder.

When the support is extended, yield of the cylinder 1 is resisted by the fluid pressure acting on areas A and B. It will be seen that the fluid pressure in the cylinder 1 acts on the area A and is reacted by the upper surface of the piston 5 back to the piston 2a via the piston rod 4, the underside of the piston 5 being vented at 9A, 9.

If the pressure be $p$ then there is a force $B \times A$ forcing cylinder 1 upwardly with respect to the piston 5. Since all the cylinders are in communication, the same pressure $p$ acts on the underside of the piston 1a and is reacted by the base of the cylinder 3 since the piston 2a is in pressure balance. Thus the total force acting to resist yield of the cylinder 1 is $p(A+B)$. It will, therefore, be seen that when the combined areas A and B are substantially equal to the end area of the cylinder 3, which, of course, corresponds to the full area side of the piston 2a, the support can be arranged to have a constant local/yield with the use of a single pressure relief valve (not shown) conveniently connected to the cylinder 3. That is to say when the pressure p generated in the support due to the roof load exceeds the yield pressure, the support as a whole will yield, hydraulic fluid being expelled through the single pressure valve which of course maintains a substantially constant pressure within the support.

If the combined areas A and B are slightly smaller than the end area of the cylinder 3, the support will extend as described above, that is to say the first cylinder will extend first. When however the first cylinder 1 is stopped by an external load, e.g. the roof of a mine, before it has commenced to draw the second cylinder after it, or before the second cylinder is fully extended, then, subject to seal friction, the second cylinder will extend or continue to extend, closing on the first cylinder, due to there being a small net force acting on the second piston 2a to raise the second cylinder 2.

When the combined areas A and B are less than the end area of cylinder 3, and disregarding the effects of seal friction, the first cylinder 1 will yield first, yield being opposed by the force of fluid pressure acting on the combined areas A and B. When the cylinder 1 is fully closed within the cylinder 2 the closing force is transmitted to the second piston 2a and the cylinder 2, and yield is opposed by force of fluid pressure acting on the full area side of piston 2a which is of course the same as the end area of the cylinder 3.

If the combined areas A and B are slightly greater than the end area of the cylinder 3 then there will in fact be a slight force tending to move the second cylinder downwardly. This will not, however, alter the manner in which the support extends i.e. the cylinder 1 will still rise first and then draw the second cylinder after it. When the combined areas A and B are slightly greater than the end area of the cylinder 3, and disregarding effects of seal friction, the second cylinder will yield first.

The support is lowered under the influence of gravity when the fluid pressure inlet 11 is connected to exhaust.

Referring now to FIGURE 2, a modified roof support is shown. The basic construction remains the same as in FIGURE 1 and corresponding parts have been given the same reference numerals. The piston rod 4 has one end integral with the third piston member 5 and its lower end abuts the second piston member 2a. The vent 8 is replaced by a fluid pressure connection and pipe line 8a, and the full area side of the piston 2a is arranged to be slightly larger than the combined areas A and B. A fluid pressure seal is provided at 14. When fluid pressure is admitted to the support, e.g. through the inlet 11, connection 8a being connected to exahust and disregarding the effects of seal friction, the second cylinder 2 will extend whether or not the first cylinder extends fully due to the end area of the cylinder 3 being slightly larger than areas A and B. When it is desired to lower the support this may be done under gravity as before or fluid pressure may be applied at connection 8a to act on the annular side of piston member 2a to close cylinder 2 into cylinder 3, inlet 11 being connected to exhaust. Since the cylinder 2 has been arranged to extend this will ensure that the prop is lowered from the roof even though the support may not close fully.

Alternatively, a fluid pressure connection may be provided in lieu of vent 9, piston 1a made fast with the cylinder 1, and a fluid pressure seal provided at 15, so that closure of the cylinder 1 in cylinder 2 can be effected positively by application of fluid pressure to the space formerly vented by 9, the inlet connection 11 being connected to exhaust.

To assist in understanding the operation, the following statement of forces is presented:

Assume—
$A$ = End area of first cylinder 1 (as FIGURE 1)
$A1$ = Area of third piston 5 and includes X-section area of piston rod 4 (but not bore area)
$B$ = Area of underside of first piston 1 (as FIGURE 1) = $C1$
$C$ = End area of third cylinder 3
$D$ = Area of piston rod bore
$P$ = Yield pressure
$RL$ = Roof load Consider the general case at yield when both cylinders 1 and 2 are extended (or partially extended) $A+B=C$, and neglecting seal friction.

The first cylinder 1 is acted on by forces as follows:

Downwards—$R_L$
Upwards—$p(A+B)$
hence
$$R_L = p(A+B)$$

The second cylinder 2 is acted on by forces as follows:

Downwards—$p(A1+C1)$
Upwards—$p(C-D)$
Net upward force—$F = p(C-D) - p(A1+C1)$
Since
$$A1+D=A, \; C1=B$$
$$F = p(C-A-B) = 0$$
since
$$A+B=C$$

If, however, C is greater or less than $A+B$ there will be a net upward or downward force respectively on cylinder 2. If the net force is upward cylinder 1 will yield first whereas if the net force is downward cylinder 2 will yield first.

If desired fluid pressure connections can be provided at both vents 8 and 9—together with fluid pressure seals at 14 and 15—for closure of cylinders 2 and 1 in cylinders 3 and 2 respectively, piston 1a being fast with cylinder 1.

In a further alternative construction shown in FIGURE 3, the piston rod 4 at its lower end abuts or is attached to piston 2a, as in FIGURE 2 or 1, but its upper end has a collar 16 on which piston member 5 rests, a fluid pressure seal being provided at 17 between the piston member 5 and the upper extremity of the rod 4. Thus, the piston rod 4 is not necessarily secured to either piston 5 or 2a. In this latter construction it is not practicable to close cylinder 1 in cylinder 2 by applying fluid pressure at vent 9 since this would lift piston member 5 off the rod. However, the cylinder 2 can be closed in the cylinder 3 as already described with reference to FIGURE 2.

In the construction of FIGURE 1 either or both of cylinders 1 and 2 can be closed in cylinders 2 and 3 respectively as has been described with reference to FIGURE 2.

What is claimed is:

1. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member and supporting said third piston member on said second piston member; means providing hydraulic connection between said first, second and third cylinders; and means for introducing fluid under pressure into said cylinders for extending said cylinders relatively to one another, the combined effective areas of the said closed upper end of the first cylinder and the said first piston member being substantially equal to the effective area of the said closed lower end of said third cylinder, whereby said support has a substantially constant load/yield characteristic.

2. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member and supporting said third piston member on said second piston member; a passage through said piston rod providing hydraulic connection between said first and third cylinders; means providing hydraulic connection between said second and third cylinders; and means for introducing fluid under pressure into said cylinders for extending said cylinders relatively to one another, the combined effective areas of the said closed upper end of the first cylinder and the said first piston member being substantially equal to the effective area of the said closed lower end of said third cylinder, whereby said support has a substantially constant load/yield characteristic.

3. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member and supporting said third piston member on said second piston member; means providing hydraulic connection between said first, second and third cylinders; and means for introducing fluid under pressure into said cylinders for extending said cylinders relatively to one another, the combined effective areas of the said closed upper end of said first cylinder and the said first piston member being slightly smaller than the effective area of said closed lower end of said third cylinder whereby the support has a substantially constant load/yield characteristic, but the said first cylinder will yield before the second cylinder.

4. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member and supporting said third piston member on said second piston member; means providing hydraulic connection between said first, second and third cylinders; and means for introducing fluid under pressure into said cylinders for extending said cylinders relatively to one another, the combined effective areas of the said closed upper end of the said first cylinder and said first piston member being slightly greater than the effective area of said closed lower end of said third cylinder, whereby the support has a substantially constant load/yield characteristic but the said second cylinder will yield before the first cylinder.

5. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member, said piston rod being secured at its upper end to said third piston member and at its lower end abutting said second piston member; means providing hydraulic connection between said first, second and third cylinders; and means for introducing fluid under pressure into said cylinders for extending said cylinders relatively to one another, the combined effective areas of the said closed upper end of the first cylinder and the said first piston member being substantially equal to the effective area of the said closed lower end of said third cylinder, whereby said support has a substantially constant load/yield characteristic.

6. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; a piston rod slidable through said first piston member and supporting said third piston member on said second piston member; means providing hydraulic connection between said first, second and third cylinders; means for introducing fluid under pressure into said cylinders for extending said cylinders relatively to one another, the combined effective areas of the said closed upper end of the first cylinder and the said first piston member being substantially equal to the effective area of the said closed lower end of said third cylinder, whereby said support has a substantially constant load/yield characteristic.

7. An hydraulically operated mine roof support comprising first, second and third telescopically connected cylinders, said first cylinder being closed at its upper end and having its lower end extending into the upper end of said second cylinder, the lower end of said second cylinder extending into the upper end of said third cylinder, and the lower end of said third cylinder being closed; a first piston member at said lower end of said first cylinder and being slidable in said second cylinder; a second piston member fast with said lower end of said second cylinder and being slidable in said third cylinder; a third piston member slidable in said first cylinder; an aperture in said third piston member; a piston rod having its upper end extending into said aperture; a fluid tight seal between said third piston member and said piston rod upper end within said aperture; a collar on said piston rod engaging said third piston member for preventing said piston rod from sliding through said aperture; another aperture in said first piston member through which said piston rod extends and is slidable, the lower end of said piston rod abutting said second piston member for supporting said third piston member; and means for introducing fluid under pressure into said cylinders for extending said cylinders relatively to one another, the combined effective areas of the said closed upper end of the first cylinder and the said first piston member being substantially equal to the effective area of the said closed lower end of said third cylinder, whereby said support has a substantially constant load/yield characteristic.

References Cited by the Examiner

UNITED STATES PATENTS 2,364,741  12/1944  Merchant _____ 92—52

FOREIGN PATENTS

| 1,176,539 | 11/1958 | France. |
| 1,192,133 | 4/1959 | France. |
| 860,164 | 2/1961 | Great Britain. |

CLAUDE A. LE ROY, *Primary Examiner.*

R. P. SEITTER, *Assistant Examiner.*